United States Patent [19]

Wettervik et al.

[11] Patent Number: 4,913,558

[45] Date of Patent: Apr. 3, 1990

[54] METHOD AND APPARATUS FOR DETECTING LEAKS AND OTHER DEFECTS ON SEWERS AND THE LIKE CHANNELS

[75] Inventors: Lennart Wettervik, S-755 90, Uppsala; Bo Ericsson, Östra Ågatan, both of Sweden

[73] Assignee: Lennart Wettervik, Uppsala, Sweden

[21] Appl. No.: 259,405

[22] Filed: Oct. 18, 1988

Related U.S. Application Data

[63] Continuation of Ser. No. 893,304, filed as PCT SE85/001127 on Oct. 30, 1985, published as WO86/03295 on Jun. 5, 1986, abandoned.

[30] Foreign Application Priority Data

Nov. 30, 1984 [SE] Sweden ............................ 8406065

[51] Int. Cl.⁴ ..................... G01N 25/72; H04N 7/18
[52] U.S. Cl. ......................................... 374/4; 358/100; 358/113; 73/40.5 R; 354/63
[58] Field of Search .................. 374/4; 358/100, 106, 358/113; 73/40, 40.5 R, 154; 354/63; 250/338

[56] References Cited

U.S. PATENT DOCUMENTS

| | | | |
|---|---|---|---|
| 3,168,909 | 2/1965 | Zurbrigen et al. | 138/97 |
| 3,453,869 | 7/1969 | Cherne | 73/40.5 R |
| 3,715,484 | 2/1973 | Latall | 358/100 |
| 3,739,089 | 6/1973 | Latall | 350/100 |
| 3,771,350 | 11/1973 | Romans | 73/40.5 |
| 3,832,724 | 8/1974 | Duval | 358/100 |
| 3,885,091 | 5/1975 | Fish et al. | 358/100 |
| 4,272,781 | 6/1981 | Taguchi et al. | 358/100 |
| 4,403,251 | 9/1983 | Domarenok et al. | 358/113 |
| 4,612,797 | 9/1986 | Barkhoudarian | 73/40.5 |
| 4,626,905 | 12/1986 | Schmidt | 358/113 |

FOREIGN PATENT DOCUMENTS 0064342 11/1982 European Pat. Off. .

Primary Examiner—William A. Cuchlinski, Jr.
Assistant Examiner—Patrick R. Scanlon
Attorney, Agent, or Firm—Shapiro and Shapiro

[57] ABSTRACT

Defects in an underground channel, such as a sewer, are detected by an infrared scanning device (preferably an infrared video camera) moved internally along the channel. The scanning device senses temperature deviations which mark defects in the channel, as, for example, deviations due to the inflow of cool extraneous water into a sewer. The scanning device is in communication with an above-ground central unit which processes the scanning device output and displays and/or records thermal representations of the defect. The central unit also monitors the location (distance travelled) of the scanning device so that the locations of defects may be determined.

15 Claims, 6 Drawing Sheets

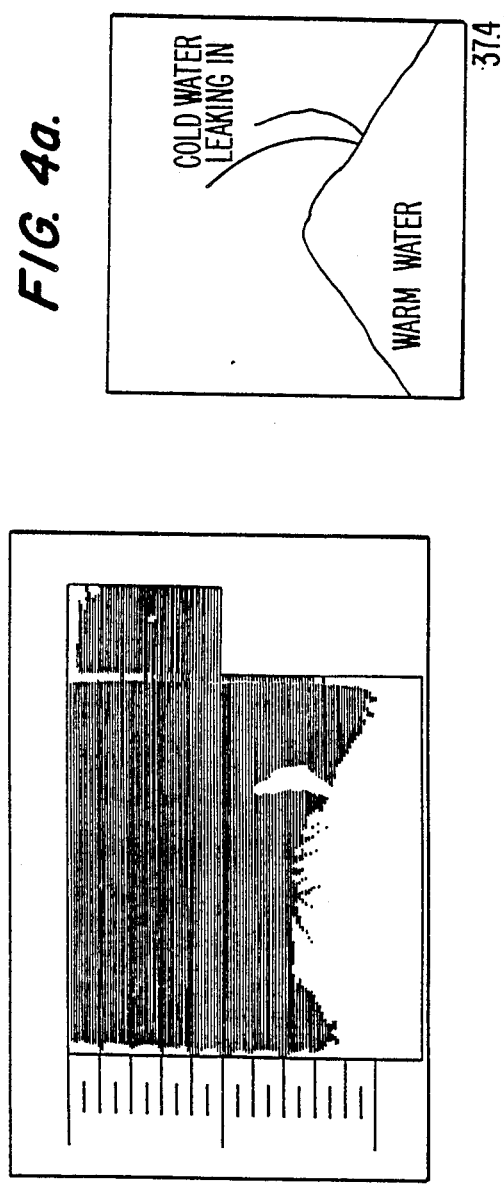

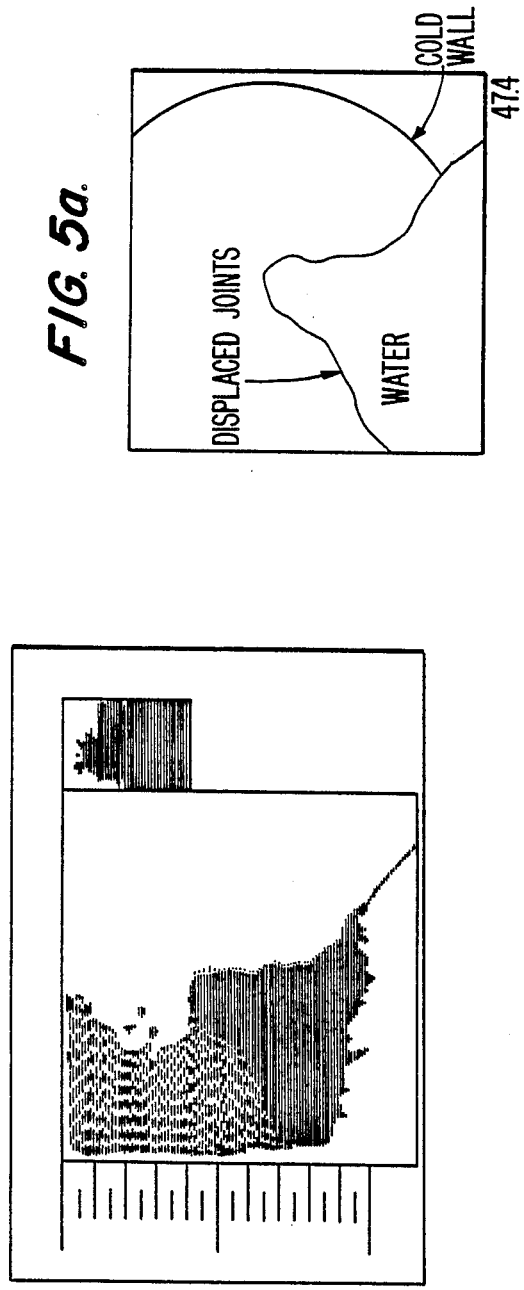

METHOD AND APPARATUS FOR DETECTING LEAKS AND OTHER DEFECTS ON SEWERS AND THE LIKE CHANNELS

This is a continuation of application Ser. No. 893,304 filed as PCT SE 85/00427 on Oct. 30, 1985, published as WO86/03295 on Jun. 5, 1986, now abandoned.

This invention relates to a method for detecting leaks and other defects on inspection of underground sewers and like channels, wherein a movable detecting and inspection unit communicating with an above ground localized central unit is moved along the sewer. The detecting and inspection unit detects defects by scanning the inside of the sewer with the aid of an IR scanning unit or like temperature registering device.

In all countries the sewage systems comprise different parts of various age and quality. A disquietingly large part of any given system will usually be in strong need of repair. It is not to exaggerate to say, that many towns today are facing a "maintenance bomb". Damages like cracks, roots growing into the sewers and displaced joints are causing leakage.

The greatest problem, however, is not water leaking out from the sewage system, but extraneous water leaking into it, e.g. ordinary ground water. This type of water in the sewage system can today make up some 50% of the total water flow, with the following consequences:

waste water treatment plants and sewers must be oversized
increased operation and treatment costs
increased costs due to the need for earlier investment in new treatment plants
lower treatment effect in existing treatment plants
overloaded sewage systems
damage to the environment as the amount of disposed waste increases
flooded basements It is very clear that the above mentioned factors strongly influence the cost for waste water treatment.

To repair a whole sewage system is not realistic, and this fact has boosted efforts to find inspection methods on which plans for repair can be based, to give priority to the worst leakages.

A number of inspection and detection methods are today in commercial use, like manual measurement of the water flow at different spots, level registration, acoustical doppler measurement, dilution measurement by means of tracer elements and TV inspection inside the sewers. By using these methods it can be confirmed that there is extraneous water in the sewers. The common shortcoming in hitherto known methods is, however, that they only indicate that there is a leakage somewhere in a part of a sewer but they do not give any clue to the exact location of most of the leakages.

Major leakages and damages have to be taken care of. The municipality budget cannot, however, carry the cost for repair and renovation to the necessary extent. The main aim with inside (for example, TV) inspection is therefore to form a basis for giving priority to certain parts of the network and to select the appropriate repair methods. The above described difficulty in obtaining an indication of the exact situation of the leakages has commonly resulted in that the whole sewer between two manholes is repaired, i.e. 100 m (330 ft) is repaired instead of the damaged parts only. Insufficient test and inspection methods have, thus, resulted in unnecessarily expensive repair techniques.

The new method of the present invention for detecting where water (ground water or surface water) leaks into a sewer includes the use of an IR scanning device, a so called THERMOVISION ® camera.

It has earlier in U.S. Pat. No. 3 771 350 been suggested to use an IR scanning device for detection of leaks from pressurized pipe lines and it is said that fluid under pressure leaking out from a pipe line causes a change of temperature. This latter statement is neither founded on any facts nor supported by any test reports or the like and must, accordingly, be regarded as mere hypothesis.

The present invention is based on the proven fact that the temperature inside a sewer, due to the temperature of the waste water flowing therethrough differs from and normally is considerably higher than the temperature of the surroundings and, thus that the temperature of any ground or surface water leaking into said sewer is lower than the inside temperature of the sewer. This fact has been utilized to create the method and apparatus according to this invention.

The new method includes the following steps:
adapting the scanning device to register and sense temperatures deviating from the prevailing temperature of the inside of the sewer or the like and being caused by ground or surface water flowing or leaking in, the prevailing temperature of the sewer being determined by the waste water flowing therethrough;
further adapting said scanning device to convey to the central unit, which includes display and recording means, signals indicating sensed temperatures and location of areas having such temperatures;
adapting a metering device connected to the scanning unit to simultaneously send to such central unit information on distance moved and processing the signals received in the central unit to give a thermal picture and location indication.

The sewer is inspected from the inside by means of a modified Thermovision ®782. The inspection is carried out in a fairly simple way.

The Thermovision ® scanner is encapsulated into a watertight protective cover and is mounted on a sledge. The sledge is pulled by a wire through the sewer between two manholes. The scanner is connected with the display unit over a long cable.

This technique of moving an inspection device through a sewer is well known and is used in the same way for TV inspection of sewers.

In practice of the new method herein disclosed, the information from the thermal camera is taped on a Video Tape Recorder together with date, number of the inspected sewer and the distance. Thus registered data are checked continuously during the field work and are evaluated later. As a basis for giving the correct priorities to various repair measures to be taken, a report is made, which comprises a video tape and an evaluation protocol where the kind of damage and the extent of the leakage and its exact location are stated.

The measurement capacity of an exemplary inspection system is approximately 400 m (1300 ft) per working day. The equipment can inspect sewers of a smallest dimension of 225 mm (9 inch).

The invention will be further described below with reference to the accompanying drawings. In the drawings FIG. 1 is a highly schematic view, partly in section, illustrating the inspection method and apparatus of the invention, FIG. 2 is a diagram illustrating the arrangement of the electronic system, FIGS. 3, 4, 5 and 6 are examples of thermographic pictures and FIGS. 3a, 4a, 5a and 6a are schematic diagrams explaining the thermographic pictures of FIGS. 3-6.

With reference to FIG. 1 a sewer with waste water is designated 1 and manhole wells are designated 2.

An IR scanning device 3 is mounted inside a waterproof protecting shell 4 with a window 5 and carried by a sledge 6. A pulling wire 7 coupled to a winch 8 is attached to the sledge and a communication cable 9 rolled off and on a reel 10 with a metering device 11, FIG. 2, connects the scanning unit 3 with a central unit 12 housed inside a van 13.

The physical environment inside sewers is, for obvious reasons, hostile to the thermographic equipment, which has, thus, to be encapsulated. This is carried out by enclosing it in the watertight sledge and using special leakproof connectors 14, e.g. of so called military type, and a rugged protective lens. The cable, which is dragged through the sewer must also be of a waterproof quality.

The surrounding temperature in the sewer ranges from 8° to 12° C. (46°-54° F.).

The thermal resolution of Thermovision® at this ambient temperature is far better than the 1° C. (2° F.) resolution required by the application.

The protection of the front lens of Thermovision® has to be a window 5, which is coated for the actual wavelengths, 2-6 microns. An uncoated sapphire window would give a strong radiation loss because of very misadapted transmission properties and high reflections as a consequence. The chosen window has a low transmission loss, is not harmed by the damp environment and has a coating which withstands frequent cleaning. The fitting of the window is, however, made in such a way, that it may be exchanged quite easily.

The application needs a wide-angle lens of 40° field of view, because of the small dimensions of the better part of the sewers, the smallest of which are 225 mm in diameter. This lens has a large depth of field, which makes it possible to sharply see very close objects as well as more remote objects, i.e. a few meters away.

As it is of greatest importance to know the exact location of a detected leak, there is a distance meter hooked up to the Thermovision® display unit, which displays the distance at the bottom end of the screen. The accuracy of the distance is a tenth of a meter (4 inches).

A code designation of the sewer being measured and a size code can also be written onto the screen beside the distance, for example 850818 364 3 68.3, meaning Aug. 18, 1985, sewer No. 364, size φ300 mm and at 68,3 m from the opening of the sewer.

The measurement is recorded on video tape together with the distance information. The evaluation gives as a result a written protocol with reference to the distance indications, with comments and with a tape.

In FIG. 2, the part to the left the double dash-dotted line indicates the scanner unit 3 inside the sewer and the part to the right of same dash-dotted line the so called central unit designated 12 in FIG. 1.

The scanner 3 is enclosed by the water and moist proof shell 4 and the cable 9 is connected to the said unit by a connector 14. Inside the van 13 is found the cable reel 10 with its metering device 11 adapted to count the length of cable reeled off (or on). The cable 9 is via a connector box 15 connected to a display unit 16 in turn via a two way cable connection 17 connected to a video tape recorder VTR 18. The metering device 11 is connected, via cable 19, to an interface, an image data terminal (IDT) 20, cooperating over a BCD unit 21 with another IDT 22—both IDTs having so called C videos 23 and 24 respectively.

The cable 25 connects the IDT 20 with a discon 26 and a monitor 27 and with the display unit 16.

Inspection of a section of a sewer 1 normally takes place between two inspection wells 2. The pulling wire 7 is fetched at the downstream well by a forerunner floated downstream from the upstream well and after lowering the scanning device 3 enclosed in the shell 4 into the sewer 1 the scanning device 3 is pulled on its sledge 6 along the sewer. The advance is controlled by the metering device 10-11 indicating the length of cable 9 rolled off. The signal from the IR scanning device 3 is received by the display unit 16 and is recorded by the VTR 18 and the signals from the metering device 10-11 are computed by the IDT 20 and fed to the display unit 16. The distance figures can be read on the display and also be recorded on the VTR 18.

The IR scanning device 3 is pulled through the sewer and the operator is in full control at his display unit and can adjust light, contrast, and sensitivity. The images are recorded and can be evaluated on any later occasion.

The thermograms shown on FIGS. 3-6 are results from an inspection of a sewer 100 meters in length and chosen at random and show detection of some examples of faults.

FIGS. 4 and 4a show an area including a joint and a finger-like light area (dark in the actual thermogram but shown light for clarity of illustration) indicates colder surface water leaking in.

FIGS. 5 and 5a show the influence of cold water surrounding and penetrating a displaced joint. Colder surface water seeps in along the joint.

Figure 1:
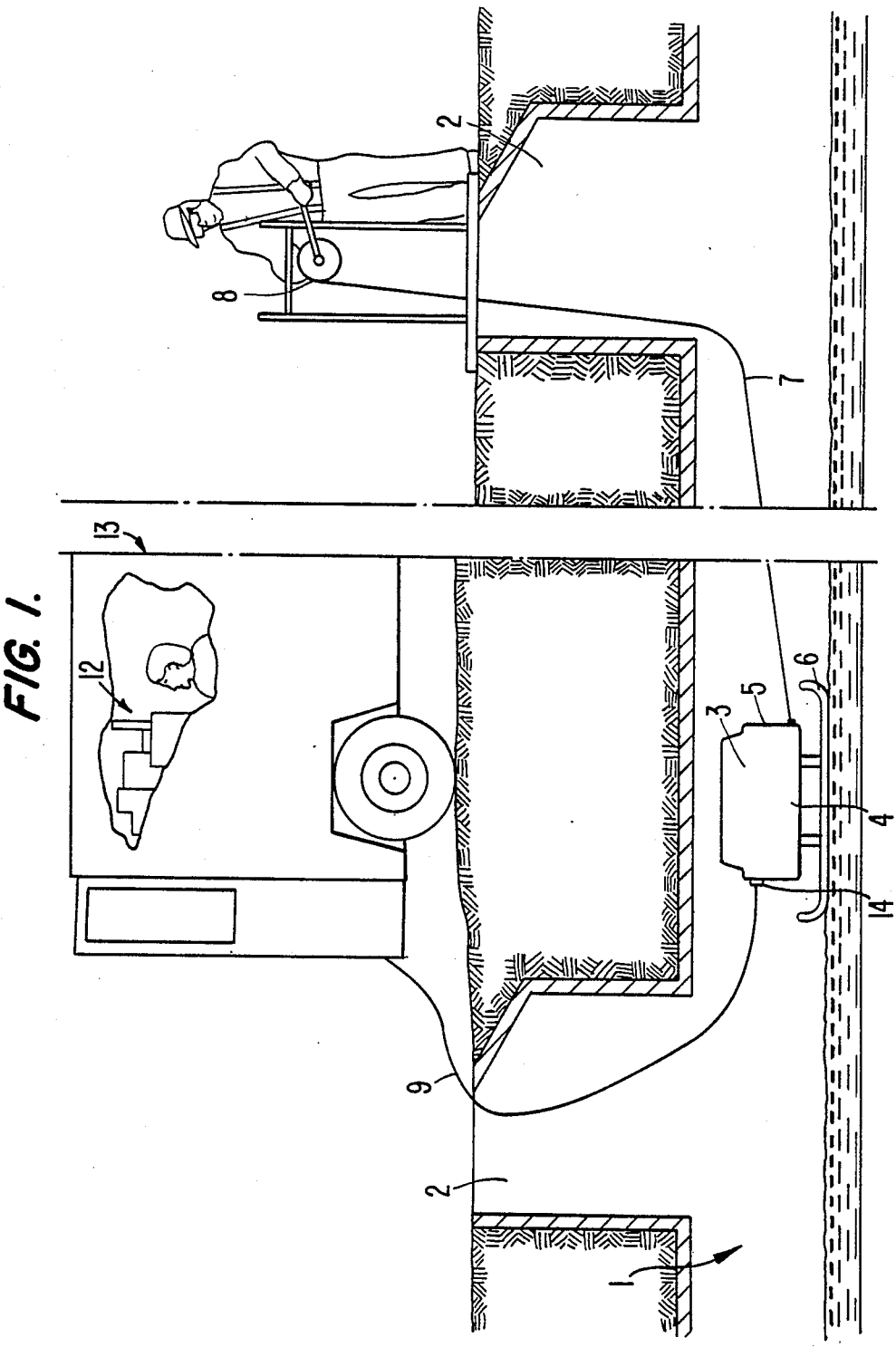
Figure 2:
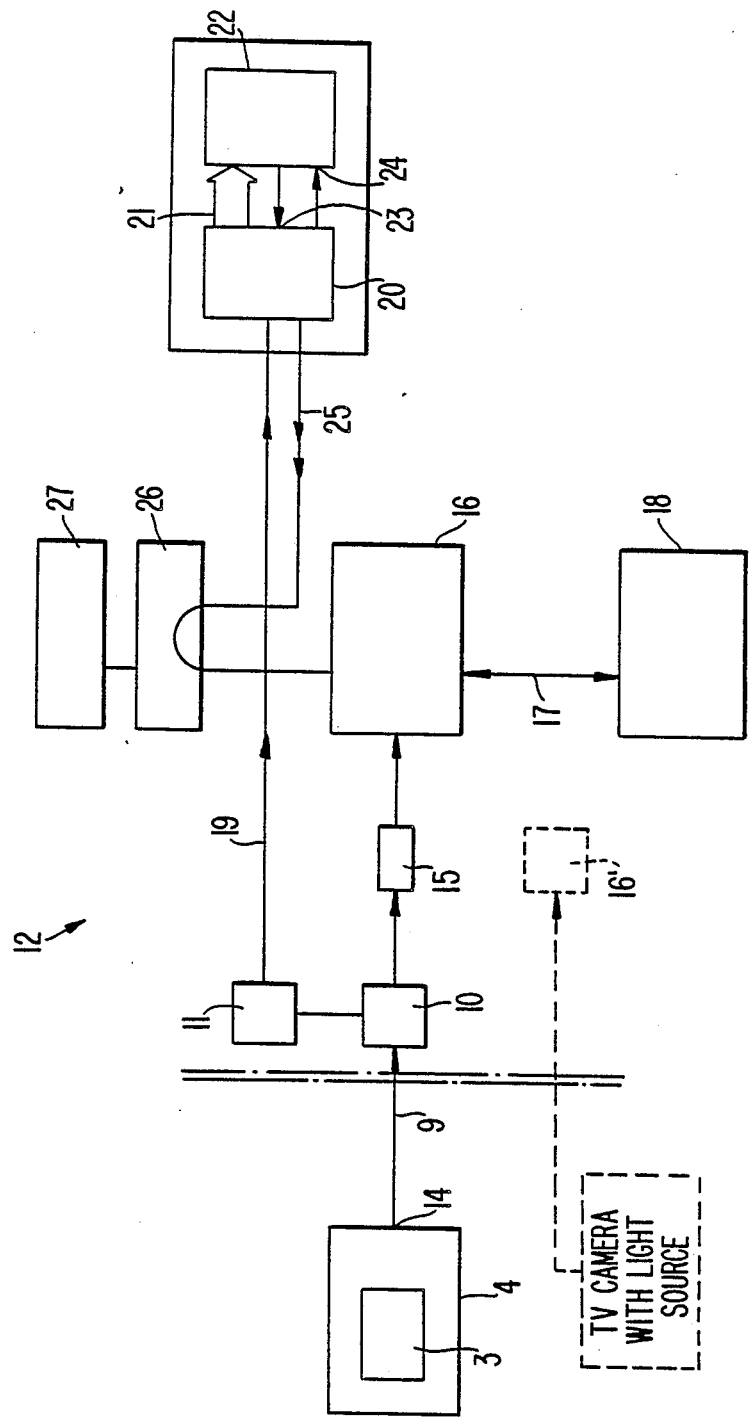
Figure 3:
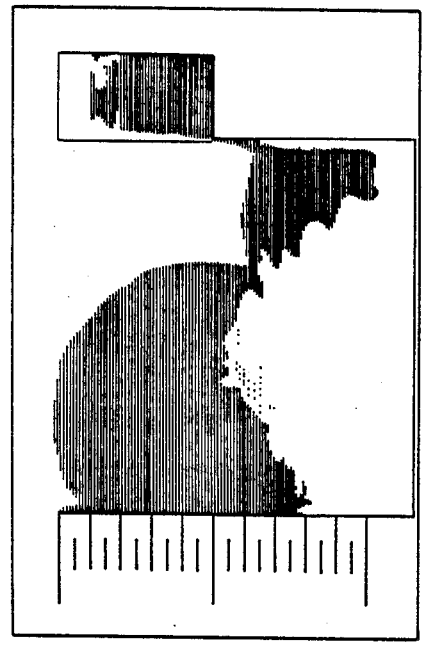
FIGS. 3 and 3a illustrate two flows of water joining at a manhole, the left flow warm and the right flow cold. The wall of the sewer is cold.
Figure 3A:
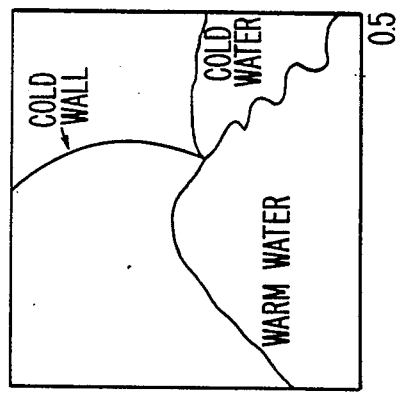
Figures 6, 6A:
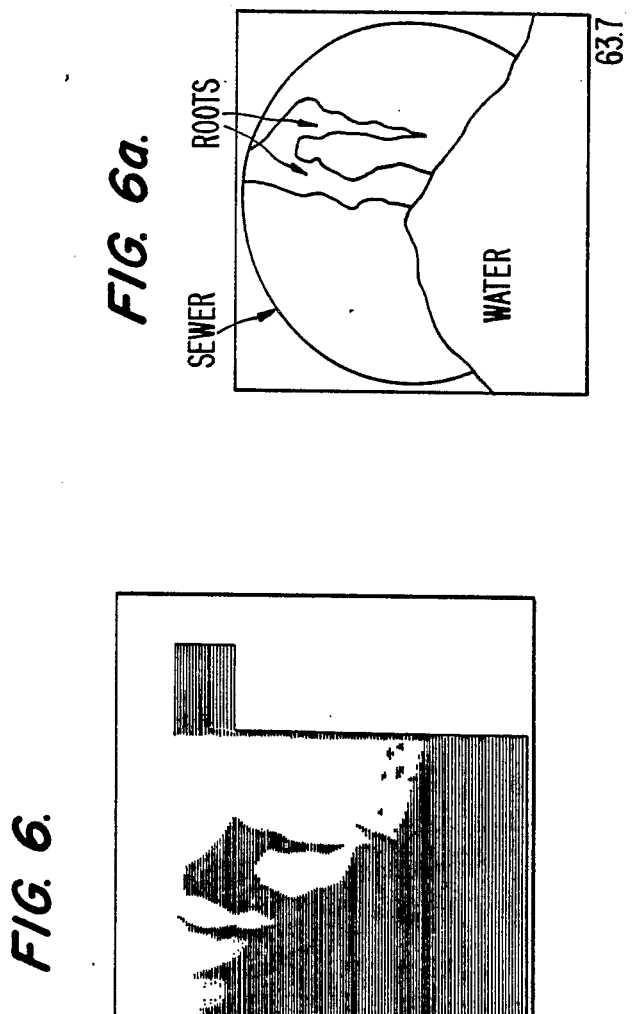
FIGS. 6 and 6a illustrate how roots have penetrated the sewer wall but not yet to an extent causing leakage. The roots taking water from the contents of the sewer are warmer than the wall behind kept cooler by the surrounding filling material.

In a modified embodiment, the IR sensing device is combined with a TV camera and an appropriate light source indicated in dashed lines in FIG. 2. Such TV camera is also connected with the central unit, which is equipped with a display means, such as 16', for the TV image and furthermore with an electronic apparatus for displaying the IR image on top of the TV image or vice versa to form a combined image. Such a combined IR and TV image is more easily read by the operator and gives both the leak indicating temperature image and a visual picture of the location and shape of the damage or leak. The IR camera and the TV camera might of course be used one at a time but the best result is attained if they are used simultaneously.

I claim:

1. A method of inspecting underground sewers for defects, comprising placing an infrared scanning device in an underground sewer, moving the scanning device internally along the sewer to locate defects at which extraneous water is leaking into the sewer from the surrounding ground by sensing with the scanning device temperature deviations caused by the extraneous water leaking into the sewer at the defects, and processing output signals from the scanning device for at least one of displaying and recording thermal representations of the defective areas.

2. The method of claim 1, wherein the processing step is conducted at an above-ground central unit to which the scanning device output signals are transmitted.

3. The method of claim 2, including moving a television camera coupled to the central unit along the sewer to provide video images of the defective areas at the central unit.

4. The method of claim 1, including metering the distance the scanning device has moved along the sewer line and correlating metered distances with the scanner output to identify the locations of the defective areas.

5. The method of claim 4, wherein the metered distances are at least one of displayed and recorded with corresponding thermal representations of the defective areas.

6. A method of inspecting underground sewers for defects, comprising placing an infrared video camera in an underground sewer, coupling the camera to a distance metering device which produces distance-indicating signals, providing an above-ground central unit having video signal processing means and means for processing the distance-indicating signals, moving the camera internally along the sewer to locate defects at which the sewer is open to the surrounding ground by taking video thermal images of defect areas of the sewer showing temperature deviations due to the sewer being open to the surrounding ground at the defects, and transmitting video output signals of the camera and distance-indicating signals of the distance metering device to the corresponding signal processing means of the central unit for at least one of displaying and recording of the video thermal images taken by the camera of the defective areas, along with corresponding distance locations of the defective areas.

7. The method of claim 6, wherein the temperature deviations are the result of extraneous water of lower temperature than the interior of the sewer leaking into the sewer.

8. The method of claim 6, wherein the temperature deviations are the result of roots which have penetrated the sewer from cooler ground surrounding the sewer.

9. The method of claim 6, wherein the thermal images are recorded on video tape together with the corresponding distance locations.

10. The method of claim 6, wherein the thermal images are displayed on a video display together with the corresponding distance locations.

11. The method of claim 6, wherein a television camera is also moved internally along the sewer line, and images taken by the television camera of the defective areas are displayed on a video display of the central unit.

12. The method of claim 11, wherein the television images are combined with the thermal images.

13. Apparatus for inspecting an underground sewer for defects characterized by temperature deviations due to the sewer being open to the surrounding ground at the defects, comprising a waterproofed infrared video camera mounted on means for transporting said camera internally along the sewer, an above-ground central unit having video signal processing means for processing output signals of said camera for at least one of displaying and recording video thermal images taken by said camera of defect areas of the sewer showing temperature deviations due to the sewer being open to the surrounding ground at the defects, communication means for transmitting output signals of said camera to said signal processing means of said central unit, distance metering means coupled to said camera for providing distance signals to said central unit, said central unit having means for processing said distance signals for at least one of displaying and recording distance locations corresponding to the video thermal images taken by said camera.

14. The apparatus of claim 13, further comprising television camera means for transport internally along the sewer, and means for transmitting output signals of said television camera means to said video signal processing means, said video signal processing means including means for displaying the video thermal images taken by said infrared camera with television images taken by said television camera means.

15. The apparatus of claim 14, wherein said thermal images and said television images are combined by said video signal processing means.

* * * * *